United States Patent [19]
Michelotti

[11] Patent Number: 6,023,221
[45] Date of Patent: Feb. 8, 2000

[54] SYSTEM TO ACTIVATE AUTOMOBILE HAZARD WARNING LIGHTS

[76] Inventor: Paul E Michelotti, P.O. Box 417, Ridgefield, Conn. 06877

[21] Appl. No.: 08/917,590

[22] Filed: Aug. 25, 1997

[51] Int. Cl.[7] .................................................. B60Q 1/52
[52] U.S. Cl. ........................ 340/471; 340/468; 340/464; 340/463; 340/467; 340/469
[58] Field of Search ..................... 340/463, 464, 340/466, 467, 468, 469, 471, 479, 658

[56] References Cited

U.S. PATENT DOCUMENTS

| | | | |
|---|---|---|---|
| 4,357,594 | 11/1982 | Ehrlich et al. | 340/467 |
| 4,663,609 | 5/1987 | Rosario | 340/467 X |
| 4,987,405 | 1/1991 | Jakobowski . | |
| 4,990,887 | 2/1991 | Lee | 340/479 |
| 5,139,115 | 8/1992 | Browne et al. | 188/1.11 E |
| 5,231,373 | 7/1993 | Freeman et al. | 340/469 |
| 5,394,326 | 2/1995 | Liu | 364/424.05 |
| 5,712,617 | 1/1998 | Quan . | |

FOREIGN PATENT DOCUMENTS 501555  12/1997  European Pat. Off. .

*Primary Examiner*—Daryl Pope

[57] ABSTRACT

An automotive safety system that will automatically activate hazard warning lights under circumstances of hard braking or sudden stoppage. The system incorporates an accelerometer which measures the longitudinal acceleration of the vehicle and a microcontroller which processes the acceleration readings. When a series of deceleration values in excess of a predetermined threshold is detected, the microcontroller transmits an activation signal and the hazard warning lights are activated to warn other motorists. The hazard lights, when activated, remain active until they are either manually reset by the vehicle operator or automatically reset by the microcontroller when it detects a series of positive acceleration values consistent with normal vehicle operation. The hazard warning lights of this system are activated independently of the brake lights such that, in an accident situation, the hazard lights will activate even if the vehicle operator has not pressed the brake pedal.

6 Claims, 1 Drawing Sheet

SYSTEM TO ACTIVATE AUTOMOBILE HAZARD WARNING LIGHTS

BACKGROUND OF THE INVENTION

1. Field of the Invention

The present invention relates to a system to automatically activate automobile hazard warning lights upon rapid deceleration of the automobile as by hard braking.

Automobiles are normally equipped with conventional brakelights that are turned on upon activation of the brake pedal when slowing down or stopping the vehicle. A driver in a following vehicle will be alerted accordingly. However, the following driver will generally not know whether the first vehicle is being braked in a normal slowing manner or rapidly as in an emergency situation.

The present invention contemplates the automatic activation of the automobile's hazard warning lights upon rapid deceleration of the automobile as by hard braking. Thus the following vehicle will see the hazard warning lights in an emergency situation and be able to react more quickly thereby avoiding a collision which might otherwise occur.

Each year, in the United States alone, there are approximately twelve million auto accidents resulting in more than forty thousand deaths and two million injuries. It is estimated that approximately half are rear-end type collisions. If the automatic activation system could reduce these figures by only five percent, the human and financial benefits would be enormous.

Modern highway systems in or near metropolitan areas are designed to accomodate large volumes of high speed vehicular traffic. It appears, however, that many commuters who use these highways on a regular basis are so familiar with the layout of the roadway that they become complacent and follow too closely or fail to use proper caution under circumstances of reduced visibility. This has resulted in an alarming increase in the frequency and severity of chain reaction collisions both in this country and abroad.

An automatic activation system, by providing the earliest possible indication of heavy braking or collision, would greatly diminish the frequency and severity of such events.

The automatic activation system would also have value in situations involving only one or several vehicles. It appears that there is often a significant time lag following an accident or dangerous situation before many motorists remember to activate their flashers. And, needless to say, in the event of serious injury it is unlikely that an activation will occur.

2. Description of the Prior Act

Various systems exist for controlling automobile brake lights to indicate braking situations to following vehicles. The conventional system is a mechanical switch that closes on brake activation to energize the brake lights. Then, upon release of the brake the switch opens and the lights extinguish.

U.S. Pat. No. 4,990,887 discloses a brake light arrangement that provides a time delay in the extinguishing of lighted brake lights. Thus, when the lights are energized they will continue to be illuminated for a predetermined period of time.

U.S. Pat. No. 5,139,115 discloses a system in which the brake lights are lighted in the usual manner under normal braking conditions but flash when the anti-lock braking system of the vehicle is activated.

The prior art fails to show a system in which the rapid deceleration of the vehicle is detected to independently from the brake and brakelight system.

SUMMARY OF THE INVENTION

A single-axis digital accelerometer is mounted parallel to the longitudinal axis of the vehicle and produces a pulse rate output that is proportional to the magnitude of vehicle acceleration. A microcontroller receives and stores accelerometer output and activates the hazard warning lights through a switching circuit when a series of deceleration values corresponding to heavy or prolonged braking occurs.

The microcontroller can also be programmed to deactivate the warning lights when a series of positive accelerations corresponding to normal vehicle operation occurs following an automatic activation.

A dual function on/off button on the vehicle dashboard allows for manual operation of the warning lights and also enables the vehicle operator to over-ride automatic activations or cancellations. In the event of an automatic activation, the driver will be alerted by a light in the button and other aural and visual indications normally associated with manual operation.

A modular unit consisting of a voltage regulator, accelerometer, microcontroller, switching relay and manual function button is anticipated. The vehicle dashboard will be designed to receive the unit in a manner that places the axis of the accelerometer essentially parallel to the longitudinal axis of the vehicle.

The activation program consists of a time versus pulse rate summation. For example, a series of very high deceleration values might require a duration of one second in order to activate the lights. A moderate series of deceleration values, on the other hand, might require a duration of five or more seconds to activate the system.

The specific activation program will be determined through testing and evaluation and may be vehicle specific. A switch designed for a tractor-trailer, for examples might require a different program than one designed for a compact passenger vehicle.

In all cases, however, the minimum time requirement will be sufficient to prevent momentary acceleration values associated with road irregularities from activating the system. An automatic cancellation program, if desired, would consist of an appropriate time versus pulse rate summation in the direction of positive acceleration.

An object of the present invention is to provide a vehicle hazard warning light system that quickly, automatically and accurately indicates the rapid deceleration of the vehicle.

Another object of the present invention is to provide a vehicle brake lighting hazard warning light system that senses the deceleration of the vehicle to activate said lights.

BRIEF DESCRIPTION OF THE DRAWING

The foregoing and still other objects and advantages of the present invention will be more apparent from the following detailed explanation of the preferred embodiments of the invention considered in connection with the accompanying drawing herein in which:

The FIGURE is a schematic diagram of the vehicle lighting control system of the present invention.

DESCRIPTION OF A SPECIFIC EMBODIMENT

Figure 1:
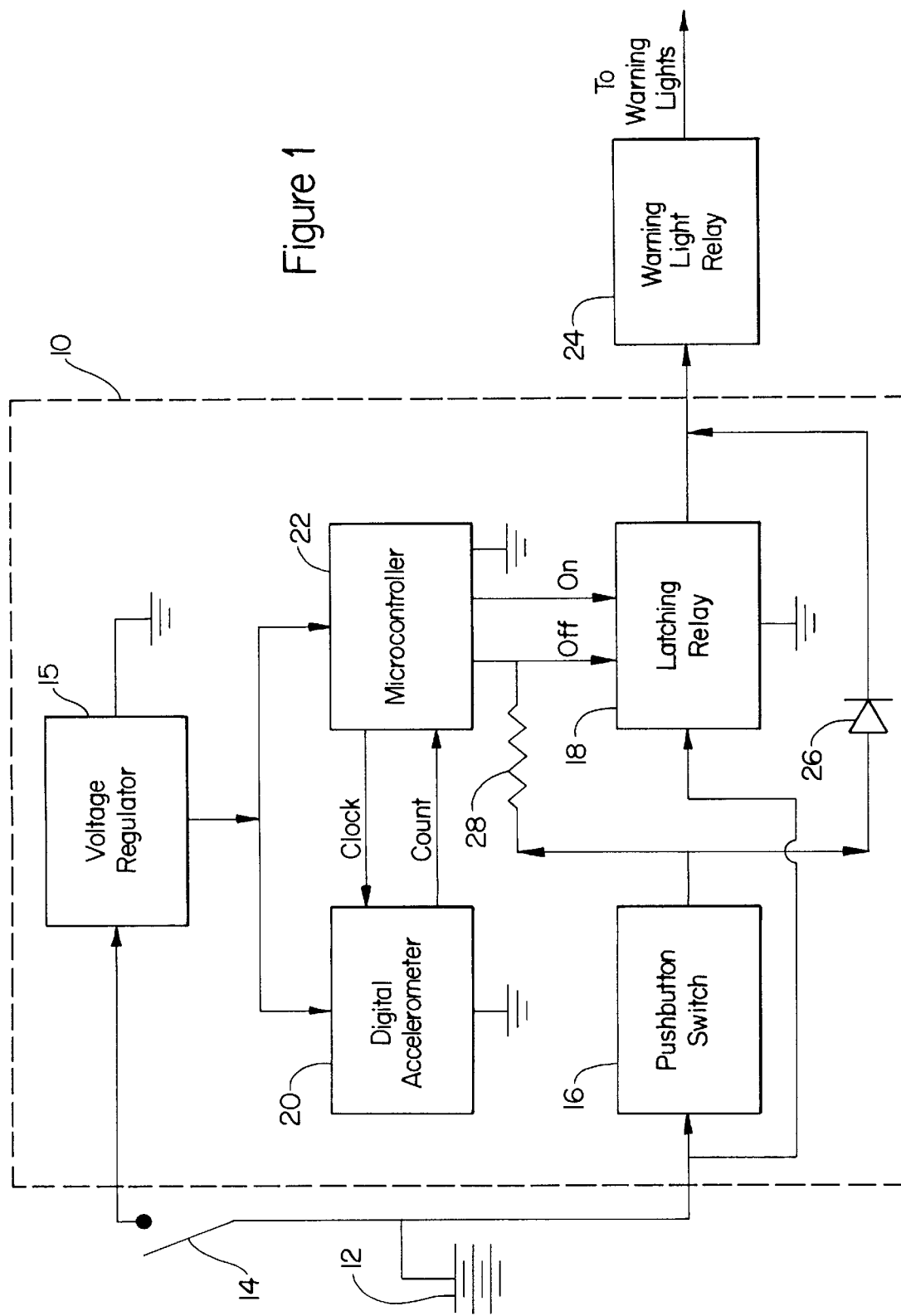

Referring now to the drawing, the electrical components of the invention are indicated at 10. The vehicle power source 12 that is available only when the ignition key 14 is on supplies current to a voltage regulator 15. The power source also continuously supplies voltage to a pushbutton switch 16 and latching relay 18. This arrangement prevents battery drain when the vehicle is not in operation and ensures that the hazard warning lights will remain powered in the event of an accident when it is necessary to turn the ignition key off. It also allows for manual control of the warning lights when the vehicle is not in operation.

The voltage regulator reduces vehicle electrical system voltage to the required input level for the digital circuitry which is normally +5 volts for commercially available components. In the event that application specific integrated circuitry to operate on the vehicle electrical system voltage is used, the voltage regulator would not be required.

A digital accelerometer 20 consists of a sensing element and an electronic chip assembled in a single integrated unit. The sensing element consists of machined microstructures that respond to acceleration by changing their capacitances. The integrated electronics chip measures changes in capacitance caused by acceleration and converts those changes into a digital pulse output. The digital acceleration unit is a commercially available device and may be of the type sold by Silicon Designs, Inc. as Model 1010.

A microcontroller 22 includes a clock generator which is activated upon closure of the ignition key switch. A clock signal is transmitted to the digital accelerometer and the number of pulses generated per clock cycle represents both the amount and direction of acceleration of the vehicle. That is, based on rated measuring capacity of the accelerometer 20, a zero pulse rate would indicate full scale negative acceleration, and a maximum pulse rate would indicate full scale positive acceleration. A mid-range value would reflect zero acceleration.

The microcontroller 22 is programmed to transmit an "on" signal to the latching relay 18 when an accumulated pulse count indicative of rapid deceleration resulting from hard or prolonged braking or sudden stoppage is recognized.

Specific thresholds of deceleration and activation are predetermined. An automatic cancellation feature may also be programmed into the microcontroller. In such case, an "off" signal is transmitted to the latching relay when an accumulated pulse count or series of counts indicative of normal positive acceleration is recognized.

The latching relay 18 contains two coils which open and close the relay contacts. When an "on" signal is received from the microcontroller, the relay closes and it remains closed until a subsequent "off" signal is received from either the microcontroller or the pushbutton switch 16.

With the relay closed vehicle electrical system voltage is supplied to the turn signal/hazard warning relay 24 which, in turn, activates the hazard warning lights.

The pushbutton switch allows vehicle electrical system voltage to be connected directly to the turn signal/hazard warning relay and, through a resistor 28, to the "off" coil of the latching relay. This arrangement allows the vehicle operator to activate the hazard warning lights manually or to cancel an automatic activation by cycling the pushbutton on and then off.

The resistor 28 reduces electrical system voltage to the operating range of the relay coil and prevents arcing or other damage to the microcontroller.

A diode 26 in the routing between the pushbutton and the turn signal/hazard warning relay prevents latching relay output from backfeeding into the "off" coil in the event of an automatic activation.

Although the invention has been described with respect to controlling the standard hazard warning lights on an automobile it is understood that it may control any vehicle light system for warning following vehicles. Thus the term hazard warning lights as used herein includes any vehicle mounted lights for alerting or warning other vehicles of a hazardous condition.

The term acceleration as used herein includes negative acceleration or deceleration. The term frequency as used herein pertains to pulses per interval of time.

Having thus described the invention with particular reference to the preferred forms thereof it will be obvious that various changes and modifications may be made therein without departing from the spirit and scope of the invention as defined in the appended claims. It should also be noted that while the foregoing description pertains to a digital system, the invention can be constructed on either a digital or analog circuit basis.

What is claimed is:

1. In a motor vehicle having hazard warning lights and a manual control switch, an improvement consisting of electronic circuitry which causes the hazard warning lights to automatically activate under circumstances of rapid decelearation and to remain activated until manaually reset by the vehicle operator or automatically reset by electronic recognition of a resumption of normal vehicle operation, said electronic circuitry comprising:

sensing means to detect acceleration and deceleration of the vehicle;

said sensing means including means to produce a signal indicating the rate of acceleration or deceleration of the vehicle;

means to determine when the rate of deceleration exceeds a predetermined threshold level for a predetermined time interval;

means to automatically activate the hazard warning lights when said rate of deceleration exceeds said predetermined threshold level for said predetermined time interval;

means to maintain hazard warning light activity beyond the incident of deceleration which causes activation;

means to automatically deactivate the hazard warning lights when the rate of deceleration drops below the predetermined threshold level for a predetermined length of time and changes in acceleration of the vehicle indicate normal vehicle operation; and whereby the hazard lights are automatically activated to provide a warning that a rapid deceleration of the vehicle is occurring or has taken place and automatically deactivate when normal operation of the vehicle is resumed.

2. A system, as in claim 1, further comprising:

manual control means connected to the hazard warning lights for manually activating and deactivating the hazard warning lights; and the manual control means, when aperated, overrides the automatic system.

3. A system, as in claim 1, in which the hazard warning lights are flashing lights.

4. A system, as in claim 1, in which the sensing means is a digital accelerometer.

5. A system, as in claim 4, in which the means to activate the hazard warning lights further comprises a microcontroller.

6. A system, as in claim 1, in which the means to maintain hazard warning light activity beyond the incident of deceleration which causes activation further comprises a relay.

* * * * *

UNITED STATES PATENT AND TRADEMARK OFFICE
CERTIFICATE OF CORRECTION

PATENT NO.    : 6,023,221
DATED         : February 8, 2000
INVENTOR(S)   : Paul E. Michelotti It is certified that error appears in the above-identified patent and that said Letters Patent is hereby corrected as shown below:

Title page,
Item [75], change Inventor's address to -- 2850 Banyan Blvd. Circle N.W., Boca Raton, FL 33431 --

Column 1,
Line 66, delete "detected to independently" add -- detected independenly --

Column 2,
Line 49, delete "brake lighting"

Signed and Sealed this

Twenty-first Day of October, 2003

JAMES E. ROGAN
*Director of the United States Patent and Trademark Office*